(12) United States Patent
Liang et al.

(10) Patent No.: US 12,389,392 B2
(45) Date of Patent: Aug. 12, 2025

(54) RESOURCE SCHEDULING METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Bin Liang, Guangdong (CN); Jing Xu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 394 days.

(21) Appl. No.: 18/146,747

(22) Filed: Dec. 27, 2022

(65) Prior Publication Data

US 2023/0217433 A1 Jul. 6, 2023

Related U.S. Application Data

(63) Continuation of application No. PCT/CN2020/120504, filed on Oct. 12, 2020.

(51) Int. Cl.
*H04W 72/1268* (2023.01)
*H04L 5/00* (2006.01)
*H04W 72/23* (2023.01)

(52) U.S. Cl.
CPC ....... *H04W 72/1268* (2013.01); *H04L 5/0094* (2013.01); *H04W 72/23* (2023.01)

(58) Field of Classification Search
CPC .. H04W 72/1268; H04W 72/23; H04L 5/0094
See application file for complete search history.

(56) References Cited

U.S. PATENT DOCUMENTS

| | | | |
|---|---|---|---|
| 2018/0049165 A1* | 2/2018 | Byun | H04W 72/04 |
| 2018/0083752 A1* | 3/2018 | Kim | H04L 5/001 |
| 2018/0092073 A1* | 3/2018 | Nogami | H04W 52/16 |
| 2018/0115985 A1* | 4/2018 | Lee | H04L 1/1874 |
| 2018/0124815 A1* | 5/2018 | Papasakellariou | H04W 72/1268 |
| 2018/0132264 A1* | 5/2018 | Jung | H04W 72/20 |
| 2018/0145814 A1* | 5/2018 | Liu | H04L 5/003 |
| 2018/0206258 A1* | 7/2018 | Hosseini | H04W 72/52 |

(Continued)

FOREIGN PATENT DOCUMENTS

| | | |
|---|---|---|
| CN | 109600845 A | 4/2019 |
| CN | 111278131 A | 6/2020 |

(Continued)

OTHER PUBLICATIONS

International Search Report in the international application No. PCT/CN2020/120504, mailed on Jul. 20, 2021.

(Continued)

*Primary Examiner* — Jael M Ulysse
(74) *Attorney, Agent, or Firm* — Ladas & Parry, LLP

(57) ABSTRACT

A resource scheduling method, a terminal device, and a network device are provided. The method includes: a terminal device receiving first scheduling information, the first scheduling information being used for scheduling at least two physical channels; and the terminal device determining, according to the first scheduling information, transmission resources for the at least two physical channels.

20 Claims, 19 Drawing Sheets

(56) References Cited

U.S. PATENT DOCUMENTS

| | | | |
|---|---|---|---|
| 2019/0045505 A1* | 2/2019 | Yang | H04W 72/21 |
| 2019/0052419 A1 | 2/2019 | Yang | |
| 2019/0053223 A1* | 2/2019 | Zhou | H04W 72/21 |
| 2019/0372720 A1* | 12/2019 | Lee | H04W 72/23 |
| 2020/0068610 A1 | 2/2020 | Li et al. | |
| 2020/0112416 A1* | 4/2020 | Oh | H04L 5/0007 |
| 2020/0128578 A1 | 4/2020 | Park | |
| 2020/0296697 A1* | 9/2020 | Hwang | H04W 72/23 |
| 2020/0382174 A1 | 12/2020 | Shao | |
| 2020/0403748 A1* | 12/2020 | Yokomakura | H04L 5/0048 |
| 2021/0168007 A1* | 6/2021 | Shao | H04L 5/0048 |
| 2022/0070897 A1* | 3/2022 | Hwang | H04L 1/1822 |
| 2024/0237129 A9* | 7/2024 | Park | H04L 1/1671 |
| 2024/0284469 A1* | 8/2024 | Su | H04L 1/1854 |

FOREIGN PATENT DOCUMENTS

| | | |
|---|---|---|
| EP | 3518600 A1 | 7/2019 |
| EP | 3742849 A1 | 11/2020 |
| WO | 2019033085 A1 | 2/2019 |
| WO | 2019158074 A1 | 8/2019 |
| WO | 2022077191 A1 | 4/2021 |

OTHER PUBLICATIONS

English translation of the Written Opinion of the International Search Authority in the international application No. PCT/CN2020/120504, mailed on Jul. 20, 2021.

CATT, "Discussion on propagation delay compensation enhancements", 3GPP TSG RAN WG1 Meeting #102-e R1-2005705, e-Meeting, Aug. 17-28, 2020, all pages.

OPPO, "Enhancement for Propagation Delay Compensation", 3GPP TSG RAN WG1 #102-E R1-2006062, Aug. 17-Aug. 28, 2020, all pages.

Huawei, HiSilicon, "Enhancements for support of time synchronization", 3GPP TSG RAN WG1 Meeting #102-e R1-2006930, E-meeting, Aug. 17-28, 2020, all pages.

Supplementary European Search Report in the corresponding European application No. 20956973.0, mailed on Sep. 25, 2023.

* cited by examiner

S201

Transmit, by the network device, first scheduling information to a terminal device, wherein the first scheduling information is used for scheduling at least two physical channels, wherein the first scheduling information is used for the terminal device to determine transmission resources of the at least two physical channels

FIG. 3

RESOURCE SCHEDULING METHOD, TERMINAL DEVICE, AND NETWORK DEVICE

CROSS-REFERENCE TO RELATED APPLICATION

The present disclosure is a US continuation application of International Application No. PCT/CN2020/120504 filed on Oct. 12, 2020, the disclosure of which is hereby incorporated by reference in its entirety.

TECHNICAL FIELD

The present disclosure relates to the field of communication, and in particularly to a method for scheduling resource, a terminal device and a network device.

BACKGROUND

Usually, in order to receive the Physical Downlink Shared Channel (PDSCH) or the Physical Uplink Shared Channel (PUSCH) correctly, the terminal device needs to receive the Physical Downlink Control Channel (PDCCH) firstly, and the Downlink Control Information (DCI) contained in the PDCCH instructs the terminal device to receive the information needed by PDSCH or PUSCH, such as time domain resource allocation information, frequency domain resource allocation information, etc. After receiving DCI, the terminal device can schedule PDSCH or PUSCH according to the indication of DCI.

In the $5^{th}$ generation (5G) mobile communication new radio (NR) system, one piece of DCI scheduling information can schedule one corresponding PDSCH or PUSCH, and the DCI scheduling information contains information corresponding to PDSCH or PUSCH, such as the time domain resource, the frequency domain resource, modulation mode, etc. For the PDSCH, the DCI scheduling information further contains the information of the transmission time of Hybrid Automatic Repeat reQuest (HARQ) feedback information corresponding to the PDSCH. In the scenario where multi-carrier Long Term Evolution (LTE) and NR coexist, in order to reduce the interference to NR PDCCH on LTE carrier, one piece of DCI scheduling information may be tried to be used to schedule two or more PDSCH or PUSCH.

SUMMARY

The present disclosure relates to the field of communication, and in particularly to a method for scheduling resource, a terminal device and a network device.

In view of this, the embodiments of the present disclosure provide a method for scheduling resource, a terminal device and a network device, which can be used for scheduling a plurality of transmission channels.

The embodiments of the present disclosure provide a method for scheduling resource. The method is applicable for a terminal device and includes the following operations.

The terminal device receives first scheduling information. The first scheduling information is used for scheduling at least two physical channels.

The terminal device determines transmission resources of the at least two physical channels according to the first scheduling information.

The embodiments of the present disclosure provide a method for scheduling resource. The method is applicable for a network device and includes the following operations.

The network device transmits first scheduling information to a terminal device. The first scheduling information is used for scheduling at least two physical channels. The first scheduling information is used for the terminal device to determine transmission resources of the at least two physical channels.

The embodiments of the present disclosure further provide a terminal device. The terminal device includes a receiving module and a determining module.

The receiving module is configured to receive first scheduling information. The first scheduling information is used for scheduling at least two physical channels.

The determining module is configured to determine transmission resources of the at least two physical channels according to the first scheduling information.

The embodiments of the present disclosure further provide a network device. The network device includes a transmitting module.

The transmitting module is configured to transmit first scheduling information to a terminal device. The first scheduling information is used for scheduling at least two physical channels. The first scheduling information is used for the terminal device to determine transmission resources of the at least two physical channels.

The embodiments of the present disclosure further provide a terminal device. The terminal device includes a processor and a memory. The memory is configured to store a computer program, and the processor is configured to invoke and run the computer program stored in the memory to perform the method described above.

The embodiments of the present disclosure further provide a network device. The network device includes a processor and a memory. The memory is configured to store a computer program, and the processor is configured to invoke and run the computer program stored in the memory to perform the method described above.

The embodiments of the present disclosure further provide a chip. The chip includes a processor. The processor is configured to invoke and run a computer program from a memory to cause a device on which the chip is mounted to perform the method described above.

The embodiments of the present disclosure further provide a computer-readable storage medium. The computer-readable storage medium is configured to store a computer program. The computer program causes a computer to perform the method described above.

The embodiments of the present disclosure further provide a computer program product. The computer program product includes computer program instructions. The computer program instructions cause a computer to perform the methods described above.

The embodiments of the present disclosure further provide a computer program. The computer program causes a computer to perform the method described above.

BRIEF DESCRIPTION OF THE DRAWINGS

FIG. 3 is a flow diagram of a method for scheduling resource on the network side according to embodiments of the present disclosure.

DETAILED DESCRIPTION

Figure 1:
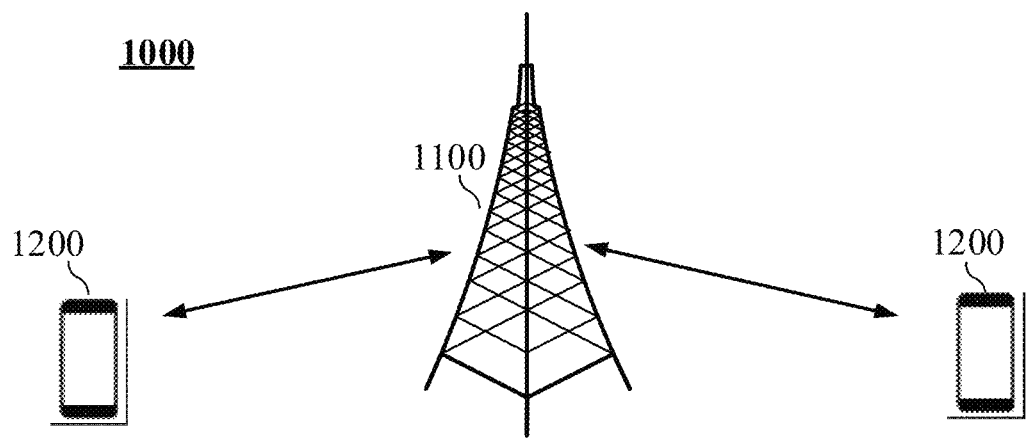
FIG. 1 is a schematic diagram of an architecture of a communication system according to embodiments of the present disclosure.

In the scenario where multi-carrier Long Term Evolution (LTE) and NR coexist, in order to reduce the interference to NR PDCCH on LTE carrier, one piece of DCI scheduling information may be tried to be used to schedule two or more PDSCH or PUSCH. However, when one piece of DCI scheduling information is used to schedule two or more PDSCH or PUSCH, how to determine the corresponding time domain resources, frequency domain resources and other information remains to be studied.

In the embodiments of the present disclosure, one piece of scheduling information can be used to schedule a plurality of physical channels. The terminal device can determine transmission resources, such as time domain resources, frequency domain resources and/or feedback information transmission resources, of a plurality of physical channels according to the one piece of scheduling information, which can improve the feasibility of scheduling a plurality of transmission channels by one piece of scheduling information, reduce control channel interference to a certain extent, and improve the overall performance of the system.

The technical solutions in the embodiments of the present disclosure will be described below with reference to the drawings in the embodiments of the present disclosure.

The technical solutions in the embodiments of the present disclosure may be applied to various communication systems, for example, Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, Advanced long term evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunications System (UMTS), Wireless Local Area Networks (WLAN), Wireless Fidelity (WiFi), 5th-Generation (5G) system or other communication systems.

Generally speaking, conventional communication systems support a limited number of connections, and are easy to implement. However, with the development of communication technology, mobile communication systems will not only support conventional communication, but also support, for example, Device to Device (D2D) communication, Machine to Machine (M2M) communication, Machine Type Communication (MTC), Vehicle to Vehicle (V2V) communication, or Vehicle to everything (V2X) communication, etc. The embodiments of the present disclosure can also be applied to these communication systems.

Alternatively, the communication systems in the embodiments of the present disclosure may be applied to a Carrier Aggregation (CA) scenario, a Dual Connectivity (DC) scenario, and a Standalone (SA) network distribution scenario.

The embodiments of the present disclosure are described in combination with a network device and a terminal device. The terminal device may also be referred to as a User Equipment (UE), an access terminal, a user unit, a user station, a mobile station, a mobile stage, a remote station, a remote terminal, a mobile device, a user terminal, a terminal, a wireless communication device, a user agent or a user device, etc.

The terminal device may be a STAION (ST) in the WLAN, a cellular telephone, a cordless telephone, a Session Initiation Protocol (SIP) telephone, a Wireless Local Loop (WLL) station, a Personal Digital Assistant (PDA) device, a handheld device having wireless communication functionality, a computing device or other processing device connected to a wireless modem, a vehicle-mounted device, a wearable device, a terminal device in a next-generation communication system such as an NR network, or a terminal device in the future evolved Public Land Mobile Network (PLMN) network.

In embodiments of the present disclosure, the terminal device may be deployed on land including indoors or outdoors, hand-held, wearable or vehicle-mounted, and it may also be deployed on the water (such as ships, etc.), and it may also be deployed in the air (such as airplanes, balloons and satellites, etc.).

In the embodiments of present disclosure, the terminal device may be a Mobile Phone, a tablet computer (Pad), a computer with wireless transceiver function, an Virtual Reality (VR) terminal device, an Augmented Reality (AR) terminal device, a wireless terminal device in industrial control, a wireless terminal device in self driving, a wireless terminal in remote medical, a wireless terminal device in smart grid, a wireless terminal device in transportation safety, a wireless terminal device in smart city or smart home, etc.

By way of example but not limitation, in embodiments of the present disclosure, the terminal device may also be a wearable device. The wearable device may also be called a wearable intelligent device, which is the general name of the wearable device developed by applying wearable technology in the intelligently design of daily wear, such as glasses, gloves, watches, clothing and shoes, etc. The wearable device is a portable device that is worn directly on the body or integrated into the clothes or accessories of the user. The wearable device is not only a kind of hardware device, but also realizes powerful functions through software support, data interaction and cloud interaction. The generalized wearable smart device has full functions and a large size, and can realize complete or partial functions without relying on smart phones, such as smart watches or smart glasses, or only focus on certain application functions, which need to be used in conjunction with other device such as a smart phone, such as various smart bracelets and smart jewelry for monitoring physical signs.

In the embodiments of the present disclosure, the network device may be a device for communicating with a mobile device. The network device may be an Access Point (AP) in WLAN, a Base Transceiver Station (BTS) in GSM or CDMA, a NodeB (NB) in WCDMA, an Evolutional Node B (eNB or eNodeB) in LTE, a relay station or an Access Point, a vehicle-mounted device, a wearable device, a network device (gNB) in NR network or a network device in future evolved PLMN network, etc.

By way of example but not limitation, in embodiments of the present disclosure, the network device may have mobility characteristics. For example, the network device may be a mobile device. Alternatively, the network device may be a satellite or a balloon station. For example, the satellite may be a low earth orbit (LEO) satellite, a medium earth orbit (MEO) satellite, a geostationary earth orbit (GEO) satellite, a High Elliptical Orbit (HEO) satellite, and the like. Alternatively, the network device may also be a base station arranged on land, water and the like.

In the embodiments of that present disclosure, the network device may provide services for a cell. The terminal device communicates with the network device through transmission resources (e.g. frequency domain resources, or spectrum resources) used by the cell. The cell may be a cell corresponding to a network device (e.g. a base station). The cell may belong to an acer station, or belong to a base station corresponding to Small cell. The Small cell here may include a Metro cell, a Micro cell, a Pico cell, Femto cell, etc. These Small cells have the characteristics of small coverage and low transmission power, and are suitable for providing high-speed data transmission services.

FIG. 1 schematically illustrates one network device 1100 and two terminal devices 1200. Alternatively, the wireless communication system 1000 may include a plurality of network devices 1100, and other numbers of terminal devices may be included within the coverage area of each network device 1100, which is not limited by embodiments of the present disclosure. Alternatively, the wireless communication system 1000 shown in FIG. 1 may also include other network entities, such as a Mobility Management Entity (MME), an Access and Mobility Management Function (AMF), etc. Embodiments of the present disclosure are not limited thereto.

It should be understood that the terms "system" and "network" are often used interchangeably herein. In the present disclosure, the term "and/or" is used to describe the association relationship between related objects. For example, the term "and/or" represents that there are three relationships between related objects before and after. For example, A and/or B represents that there are three situations: A exists alone, A and B exist simultaneously, and B exists alone. In the present disclosure, the character "/" generally represents that there is "or" relationship between the related objects before and after.

In the description of embodiments of the present disclosure, the term "corresponding" may represents that there is a direct correspondence or an indirect correspondence relationship between the two elements, may also represents that there is an association relationship between the two elements, or a relationship between indication and being indicated, configuration and being configured, etc.

Figure 2:
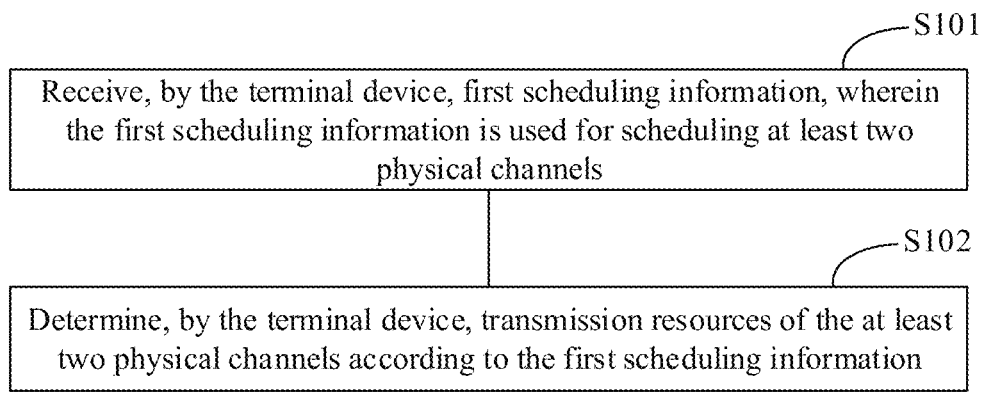
FIG. 2 is a flow diagram of a method for scheduling resource on the terminal side according to embodiments of the present disclosure.

Referring to FIG. 2, the embodiments of the present disclosure provide a method for scheduling resource. The method is applicable for a terminal device, and the method includes the following operations.

In operation S101, the terminal device receives first scheduling information. The first scheduling information is used for scheduling at least two physical channels.

In operation S102, the terminal device determines the transmission resources of the at least two physical channels according to the first scheduling information.

In the embodiments of the present disclosure, one piece of scheduling information can be used to schedule a plurality of physical channels. The terminal device can determine transmission resources, such as time domain resources, frequency domain resources and/or feedback information transmission resources, of a plurality of physical channels according to the one piece of scheduling information, which can improve the feasibility of scheduling a plurality of transmission channels by one piece of scheduling information, reduce the transmission of control information, reduce control channel interference to a certain extent, and improve the overall performance of the system.

Correspondingly, referring to FIG. 3, the embodiments of the present disclosure further provide a method for scheduling resource. The method is applicable for a network device. The method includes the following operations.

In operation S201, the network device transmits first scheduling information to the terminal device. The first scheduling information is used for scheduling at least two physical channels. The first scheduling information is used for the terminal device to determine transmission resources of the at least two physical channels.

According to the embodiments of the present disclosure, the network device schedules a plurality of physical channels by using one piece of scheduling information. The terminal device can determine transmission resources, such as time domain resources, frequency domain resources and/or feedback information transmission resources, of a plurality of physical channels according to the one piece of scheduling information, which can improve the feasibility of scheduling a plurality of transmission channels by one piece of scheduling information, reduce the transmission of control information, reduce the interference between channels to a certain extent, and improve the overall performance of the system.

According to the embodiments of the present disclosure, alternatively, the first scheduling information includes downlink control information (DCI). In other embodiments, the first scheduling information may also be carried in other types of information or signaling.

According to the embodiments of the present disclosure, alternatively, the at least two physical channels may include PDSCH or PUSCH. In other embodiments, the at least two physical channels may also include other types of transmission channels.

According to the embodiments of the present disclosure, alternatively, the transmission resources include at least one of the following: time domain resources, frequency domain resources, and feedback information transmission resources.

According to the embodiments of the present disclosure, alternatively, the at least two physical channels include a first physical channel and a second physical channel, and the first scheduling information includes first information and second information. The first information is used for determining a transmission resource of the first physical channel and the second information is used for determining a transmission resource of the second physical channel.

According to the embodiments of the present disclosure, alternatively, the at least two physical channels include a first physical channel and a second physical channel, and the first scheduling information includes third information. The third information is used for determining transmission resource of the first physical channel and transmission resource of the second physical channel.

Alternatively, the third information may indicate the starting positions and lengths of the time domain resources of the first physical channel and the second physical channel.

According to the embodiments of the present disclosure, alternatively, the operation that the terminal device determines the transmission resources of the at least two physical channels according to the first scheduling information includes: the terminal device determines the time domain resource ranges of the first physical channel and the second physical channel according to the third information.

In other words, the terminal device may determine a time domain resource range of the first physical channel according to the third information, and the terminal device may also determine a time domain resource range of the second physical channel according to the third information.

According to the embodiments of the present disclosure, alternatively, the first physical channel corresponds to a first sub-carrier spacing and the second physical channel corresponds to a second sub-carrier spacing. The terminal device may determine the time domain resource ranges of the first physical channel and the second physical channel in at least one of the following ways.

(1) If the first sub-carrier spacing is different from the second sub-carrier spacing, the terminal device determines the time domain resource ranges of the first physical channel and the second physical channel according to the third information and a reference sub-carrier spacing.

(2) If the first sub-carrier spacing is different from the second sub-carrier spacing, the terminal device determines the time domain resource range of the first physical channel according to the third information and the first sub-carrier spacing, and determines the time domain resource range of the second physical channel according to the third information and the second sub-carrier spacing.

(3) If the first sub-carrier spacing is the same as the second sub-carrier spacing, the terminal device determines the time domain resource ranges of the first physical channel and the second physical channel according to the third information and the reference sub-carrier spacing.

(4) If the first sub-carrier spacing is the same as the second sub-carrier spacing, the terminal device determines the time domain resource ranges of the first physical channel and the second physical channel according to the third information and the third sub-carrier spacing. The third sub-carrier spacing is equal to the first sub-carrier spacing or the second sub-carrier spacing.

According to the embodiment of the present disclosure, alternatively, the terminal device may determine the reference sub-carrier spacing in at least one of the following ways.

(1) The reference sub-carrier spacing is a smaller one of the first sub-carrier spacing and the second sub-carrier spacing.

(2) The reference sub-carrier spacing is a greater one of the first sub-carrier spacing and the second sub-carrier spacing.

(3) The reference sub-carrier spacing is predetermined by a protocol.

(4) The reference sub-carrier spacing is configured by a high layer.

(5) The first scheduling information further includes fourth information, and the reference sub-carrier spacing is determined based on the fourth information in the first scheduling information.

According to the embodiments of the present disclosure, alternatively, the time domain resource range of the first physical channel determined according to the third information is the same as the time domain resource range of the second physical channel determined according to the third information. In this way, the transmission complexity can be reduced and the overall performance of the system can be improved to a certain extent.

According to the embodiments of the present disclosure, alternatively, the terminal device determines frequency domain resource ranges of a plurality of physical channels in the at least two physical channels according to the first scheduling information.

According to the embodiments of the present disclosure, alternatively, the third information is used for indicating a frequency domain resource range of the first physical channel, and the third information is used for indicating a frequency domain resource range of the second physical channel. That is, the frequency domain resource ranges of both the first physical channel and the second physical channel may be determined according to the third information. In this way, the transmission amount of control information can be reduced, and thus the control channel interference can be reduced.

According to the embodiments of the present disclosure, alternatively, the operation that the terminal device determines the transmission resources of the at least two physical channels according to the first scheduling information includes: the terminal device determines the frequency domain resource ranges of the first physical channel and the second physical channel according to the third information.

According to the embodiments of the present disclosure, alternatively, the third information may be used for indicating the starting points and lengths of the frequency domain resource ranges of the first physical channel and the second physical channel, or the third information may also indicate the frequency domain resource occupancy situations of the first physical channel and the second physical channel in a bit map manner.

According to the embodiments of the present disclosure, alternatively, the frequency domain resource range of the first physical channel indicated by the third information is less than or equal to a first frequency domain range corresponding to a first carrier on which the first physical channel is located. The frequency domain resource range of the second physical channel indicated by the third information is less than or equal to a second frequency domain range corresponding to a second carrier on which the second physical channel is located.

According to the embodiments of the present disclosure, alternatively, if the frequency domain resource range of the first physical channel indicated by the third information is greater than the first frequency domain range, the terminal device takes an intersection of the frequency domain resource range indicated by the third information and the first frequency domain range as the frequency domain resource range of the first physical channel. Alternatively, if the frequency domain resource range of the second physical channel indicated by the third information is greater than the second frequency domain range, the terminal device takes an intersection of the frequency domain resource range indicated by the third information and the second frequency domain range as the frequency domain resource range of the second physical channel.

According to the embodiments of the present disclosure, alternatively, the operation that the terminal device determines the transmission resources of the at least two physical channels according to the first scheduling information includes that: the terminal device determines feedback information transmission resources of the first physical channel and the second physical channel according to the third information, such as transmission resources of HARQ feedback information.

In one embodiment of the present disclosure, the third information may be used to indicate the transmission time information of the feedback information, and the terminal device may determine the time domain position of the feedback information transmission resource according to the transmission time information of the feedback information. For example, the third information may indicate a time interval between the time slot where the feedback information is and the time slot where the end time of the transmission channel is. The time interval may be one or more time slots. The absolute time length of one time slot corresponding to different sub-carrier spacing configurations is different.

According to the embodiments of the present disclosure, alternatively, the first physical channel corresponds to a first sub-carrier spacing and the second physical channel corresponds to a second sub-carrier spacing. The terminal device may determine feedback information transmission resources of the first physical channel and the second physical channel according to at least one of the following manners.

(1) If the first sub-carrier spacing is different from the second sub-carrier spacing, the terminal device determines the feedback information transmission resources of the first physical channel and the second physical channel according to the third information and a reference sub-carrier spacing.

(2) If the first sub-carrier spacing is different from the second sub-carrier spacing, the terminal device determines a feedback information transmission resource of the first physical channel according to the third information and the first sub-carrier spacing, and determines a feedback information transmission resource of the second physical channel according to the third information and the second sub-carrier spacing.

(3) If the first sub-carrier spacing is the same as the second sub-carrier spacing, the terminal device determines the feedback information transmission resources of the first physical channel and the second physical channel according to the third information and the reference sub-carrier spacing.

(4) If the first sub-carrier spacing is the same as the second sub-carrier spacing, the terminal device determines the feedback information transmission resources of the first physical channel and the second physical channel according to the third information and the fourth sub-carrier spacing. The fourth sub-carrier spacing is equal to the first sub-carrier spacing or the second sub-carrier spacing.

(5) If the first sub-carrier spacing is the same as the second sub-carrier spacing and an end time of the first physical channel is different from an end time of the second physical channel, the terminal device determines feedback information transmission resources of the first physical channel and the second physical channel based on the later end time.

According to the embodiments of the present disclosure, alternatively, the terminal device determines the reference sub-carrier spacing according to at least one of the following manners.

(1) The reference sub-carrier spacing is a smaller one of the first sub-carrier spacing and the second sub-carrier spacing.

(2) The reference sub-carrier spacing is a greater one of the first sub-carrier spacing and the second sub-carrier spacing.

(3) The reference sub-carrier spacing is predetermined by a protocol.

(4) The reference sub-carrier spacing is configured by a high layer.

(5) The reference sub-carrier spacing is determined based on a fourth information in the first scheduling information.

According to the embodiments of the present disclosure, alternatively, the feedback information transmission time of the first physical channel determined according to the third information is the same as the feedback information transmission time of the second physical channel determined according to the third information.

According to the embodiments of the present disclosure, alternatively, a time domain position of the feedback information transmission resource of the first physical channel determined according to the third information is the same as the time domain position of the feedback information transmission resource of the second physical channel.

According to the embodiments of the present disclosure, alternatively, a time length of the time domain resource range of the first physical channel determined according to the third information is the same as a time length of the time domain resource range of the second physical channel. For example, PUCCHs corresponding to two PDSCH (first physical channel and second physical channel) are at the same time position.

According to the embodiments of the present disclosure, alternatively, a first field or a first syllable in the third information is used for indicating the transmission resources of the first physical channel and the second physical channel. For example, the transmission resources are at least one of the following: time domain resource ranges, frequency domain resource ranges, time domain positions of the feedback information transmission resources.

According to the embodiments of the present disclosure, alternatively, the third information includes a first part of information and a second part of information. The first part of information (for example, a second syllable) is used for indicating a transmission resource of the first physical channel, and the second part of information (for example, a third syllable) is used for indicating a transmission resource of the second physical channel. The transmission resource may be at least one of: a time domain resource, a frequency domain resource, and a feedback information transmission resource. In the description of embodiments of the present disclosure, the "physical channel" may also be referred to as the "transmission channel", both of which may be physical downlink shared channel (PDSCH), physical uplink shared channel (PUSCH) or other channel types suitable for embodiments of the present disclosure.

The implementation manners of the method for scheduling resource in the embodiments of the present disclosure have been described by a plurality of embodiments above, and the specific implementation process of the embodiments of the present disclosure will be described by a plurality of specific examples below.

Figure 4:
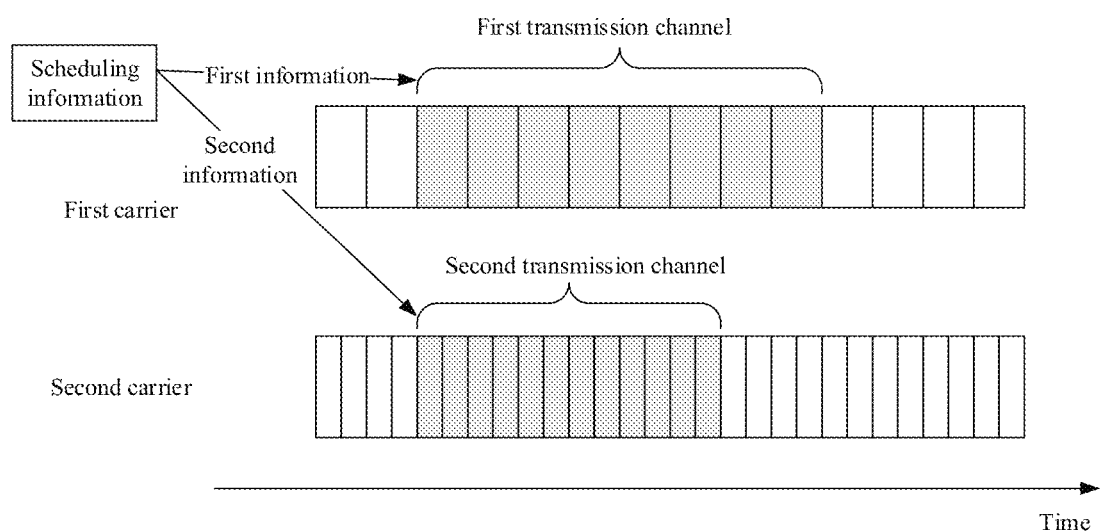
FIG. 4 is a schematic diagram of the effect of indicating time domain resources by the first information and the second information respectively according to embodiments of the present disclosure.

Embodiment 1: The First Information and the Second Information Respectively Indicate Time Domain Resources In this embodiment, the time domain resource ranges are determined by using the first information and the second information. Referring to FIG. 4, the sub-carrier spacing of the first carrier on which the first transmission channel is located is different from the sub-carrier spacing of the second carrier on which the second transmission channel is located. The first information is used for determining the time domain resource range of the first transmission channel, and the second information is used for determining the time domain resource range of the second transmission channel. The first information and the second information may indicate starting positions and lengths of time domain resources of the first transmission channel and the second transmission channel, respectively.

The two time domain resource ranges may be the same or different. Referring to the gray portion of FIG. 4, the starting position of the time domain resource indicated by the first information is different from the starting position of the time domain resource indicated by the second information. The length of the time domain resource (number of time units) indicated by the first information is also different from the length of the time domain resource indicated by the second information, and the obtained time domain resource ranges of the first transmission channel and the second transmission channel are different.

Embodiment 2: The Third Information Indicates Two Time Domain Resources

Figure 5:
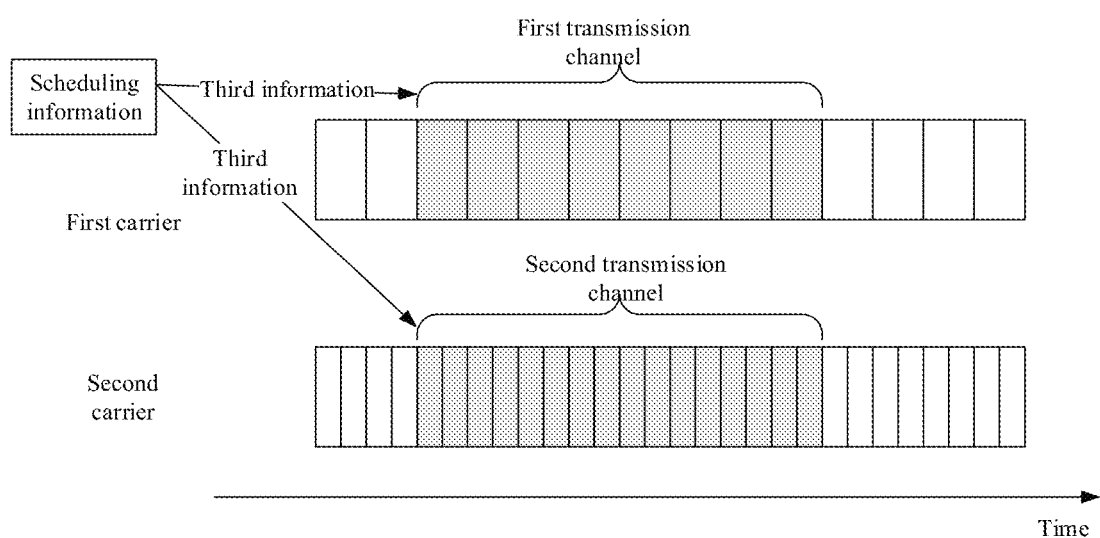
FIG. 5-FIG. 7 are effect schematic diagrams of indicating two time domain resources by the third information according to embodiments of the present disclosure.
Figure 6:
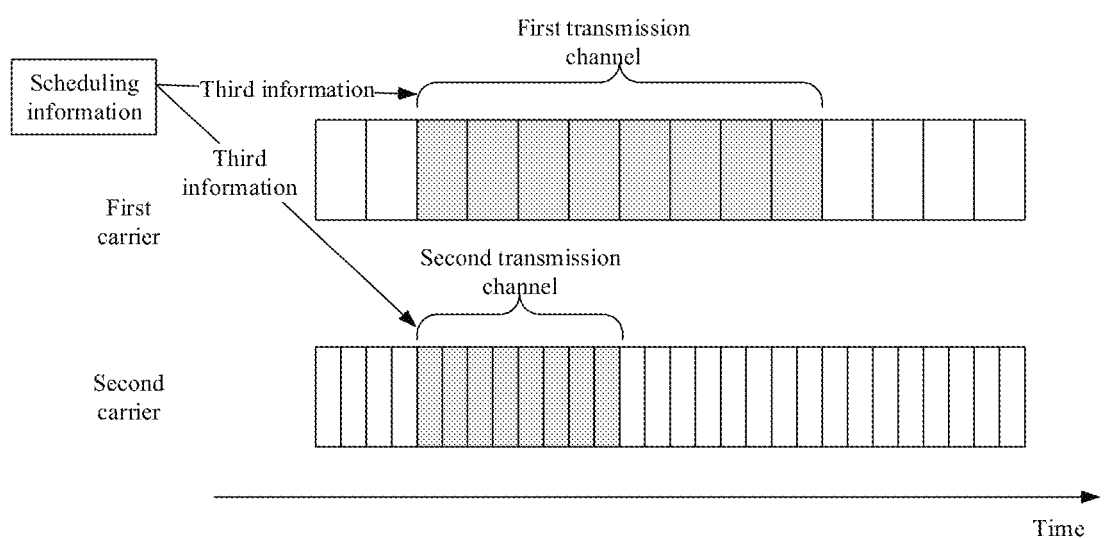
Figure 7:
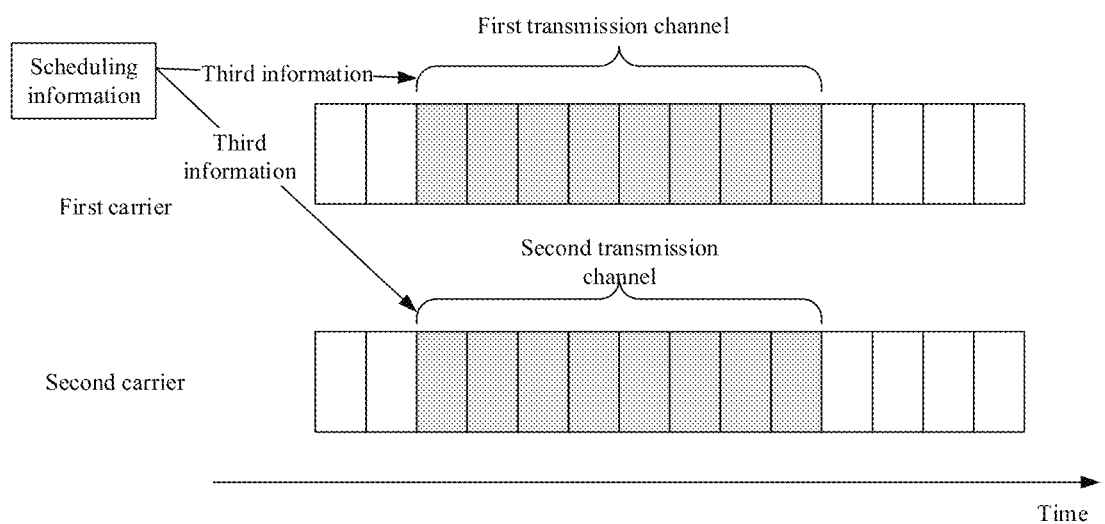

In this embodiment, the third information is used for determining two time domain resource ranges, which may be implemented in various implementation manners. FIG. 5, FIG. 6 and FIG. 7 respectively show three different situations, which will be described separately below.

Referring to the implementation manner of FIG. 5, the third information indicates two same time domain resources.

Specifically, the sub-carrier spacing of the first carrier on which the first transmission channel is located is different from the sub-carrier spacing of the second carrier on which the second transmission channel is located. For the situation of different sub-carrier spacing, for example, the sub-carrier spacing corresponding to the first carrier may be used as a reference sub-carrier spacing in accordance with protocol conventions (for example, the manners of preset value, high layer configuration, etc.), or for example, the sub-carrier spacing corresponding to the first carrier is used as the reference sub-carrier spacing according to the fourth information, so that the absolute time lengths of time domain resource ranges of the first transmission channel and the second transmission channel are same.

Exemplarily, referring to FIG. 5, the third information indicates that the time domain resource contains 8 Orthogonal Frequency Division Multiplexing (OFDM) symbols, then the time domain resource of the first transmission channel contains 8 OFDM symbols, and it is obtained that the time domain resource of the second transmission channel contains 16 OFDM symbols. The absolute time lengths of final obtained time domain resource ranges of the first transmission channel and the second transmission channel are same, and the reference is made to the gray portion in FIG. 5.

Referring to the embodiment of FIG. 6, the third information indicates two different time domain resources.

Specifically, the sub-carrier spacing of the first carrier on which the first transmission channel is located is different from the sub-carrier spacing of the second carrier on which the second transmission channel is located. For the situation with different sub-carrier spacing, the time domain resource range of the first transmission channel may be determined by using the sub-carrier spacing corresponding to the first carrier, and the time domain resource range of the second transmission channel may be determined by using the sub-carrier spacing corresponding to the second carrier.

Exemplarily, referring to FIG. 6, the third information indicates that the time domain resource range contains 8 OFDM symbols, and the time domain resource ranges are determined by sub-carrier spacings (the sub-carrier spacing of the carrier on which the first transmission channel is located is different from the sub-carrier spacing of the carrier on which the second transmission channel is located) of the carriers on which the first transmission channel and the second transmission channel are respectively located. The absolute time lengths of the obtained time domain resource ranges of the first transmission channel and the second transmission channel are different, and the reference is made to the gray portion in FIG. 6.

Referring to the embodiment of FIG. 7 the third information indicates two same time domain resources.

Specifically, the sub-carrier spacing of the first carrier on which the first transmission channel is located is the same as the sub-carrier spacing of the second carrier on which the second transmission channel is located. For the situation of the same sub-carrier spacing, the time domain resource ranges of the first transmission channel and the second transmission channel may be determined by using the sub-carrier spacings corresponding to the first carrier or sub-carrier spacings corresponding to the second carrier (both are the same).

Exemplarily, referring to FIG. 7, the third information indicates that the time domain resource range contains 8 OFDM symbols, and the time domain resource ranges of the first transmission channel and the second transmission channel are determined by sub-carrier spacings corresponding to the first carrier or the second carrier (the first carrier is the same as the second carrier). The absolute time lengths of the obtained time domain resource ranges of the first transmission channel and the second transmission channel are same, and the reference is made to the gray portion in FIG. 7.

Figure 8:
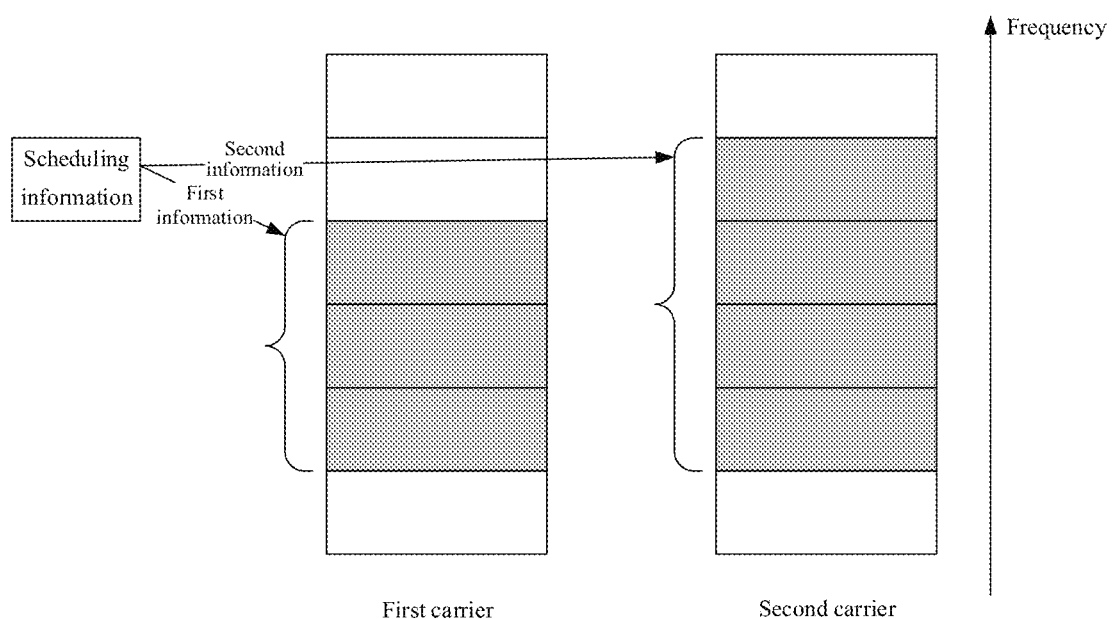
FIG. 8 is an effect schematic diagram of indicating frequency domain resources by the first information and second information respectively according to embodiments of the present disclosure.

Embodiment 3: The First Information and the Second Information Respectively Indicate Frequency Domain Resources In this embodiment, the frequency domain resource ranges are determined by using the first information and the second information. Referring to FIG. 8, the first information is used for determining the frequency domain resource range of the first transmission channel, and the second information is used for determining the frequency domain resource range of the second transmission channel. The first information and the second information may indicate starting points and lengths of frequency domain resources of the first transmission channel and the second transmission channel, respectively.

The two frequency domain resource ranges may be the same or different. In FIG. 8, the starting position of the frequency domain resource indicated by the first information is the same as the starting position of the frequency domain resource indicated by the second information. The length of the frequency domain resource indicated by the first information is different from the length of the frequency domain resource indicated by the second information, and the obtained frequency domain resource ranges of the first transmission channel and the second transmission channel are different, and the reference is made to the gray portion in FIG. 8.

Embodiment 4: The Third Information Indicates Two Frequency Domain Resources

Figure 9:
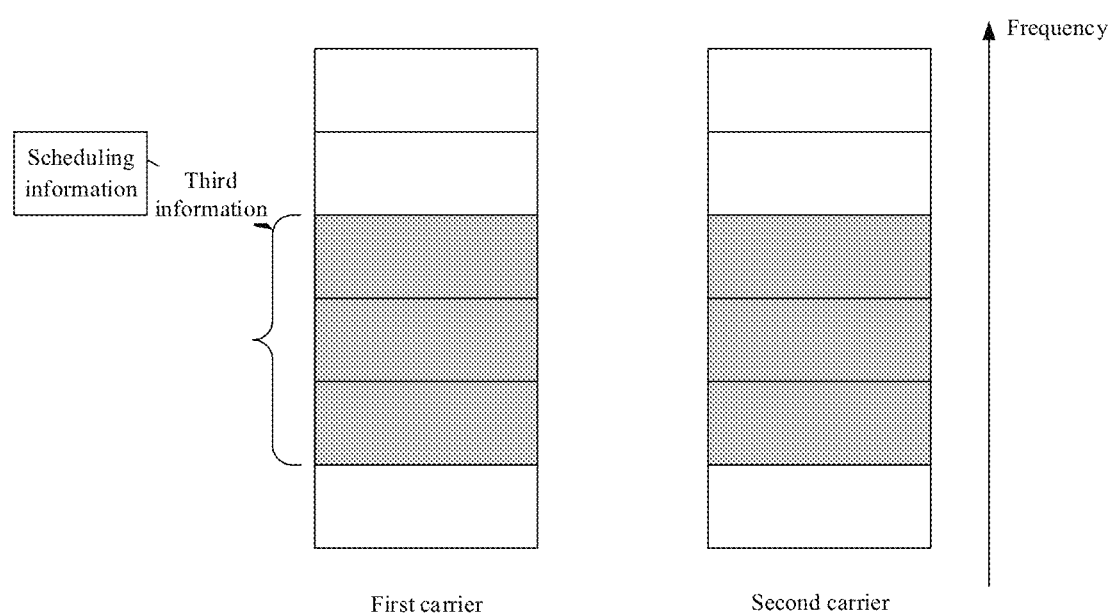
FIG. 9 and FIG. 10 are effect schematic diagrams of indicating two frequency domain resources by the third information according to embodiments of the present disclosure.
Figure 10:
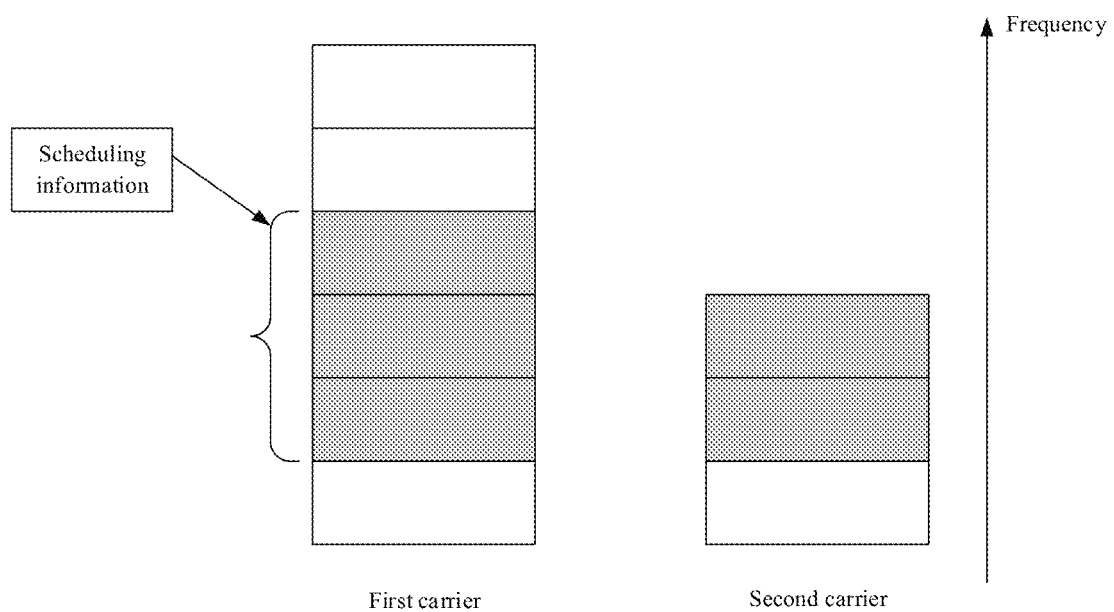

In this embodiment, the third information is used for determining two frequency domain resource ranges, which may be implemented in various implementation manners. FIG. 9 and FIG. 10 respectively show two different situations, which will be described separately below.

Referring to the embodiment of FIG. 9, the third information indicates two same frequency domain resources.

Specifically, the frequency domain resource range (gray portion) indicated by the third information is smaller than the range (white portion) of the first carrier on which the first transmission channel is located, and is also smaller than the range of the second carrier on which the second transmission channel is located. The frequency domain ranges of the first transmission channel and the second transmission channel determined according to the third information are same, and the reference is made to gray portion in FIG. 9.

Referring to the embodiment of FIG. 10, the third information indicates two different frequency domain resources.

Specifically, the frequency domain resource range (gray portion) indicated by the third information is smaller than the range (white portion) of the first carrier on which the first transmission channel is located. However, the frequency domain resource range indicated by the third information is greater than the range of the second carrier on which the second transmission channel is located. At this time, the frequency domain range of the first transmission channel determined according to the third information is different from the frequency domain range of the second transmission channel determined according to the third information. The frequency domain range of the second transmission channel is the intersection of the frequency domain range indicated by the third information and the second carrier range, and the reference is made to the gray portion in FIG. 10.

Figure 11:
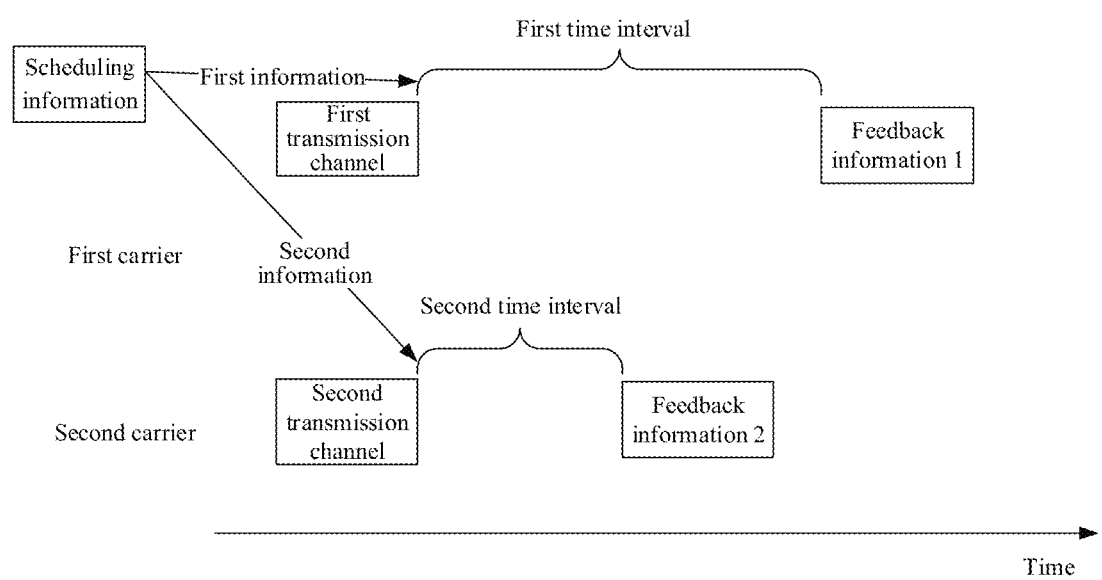
FIG. 11 is an effect schematic diagram of indicating the feedback information transmission time by the first information and the second information respectively according to embodiments of the present disclosure.

Embodiment 5: The First Information and the Second Information Respectively Indicate the Feedback Information Transmission Resources In this embodiment, the first information and the second information are used for determining feedback information transmission resources. Referring to FIG. 11, the first information is used for determining the feedback information transmission resource of the first transmission channel, and the second information is used for determining the feedback information transmission resource of the second transmission channel.

The feedback information transmission resource of the first transmission channel may be determined by using the sub-carrier spacing corresponding to the first carrier, and the feedback information transmission resource of the second transmission channel may be determined by using the sub-carrier spacing corresponding to the second carrier.

It should be noted that in the embodiments of the present disclosure, the feedback information transmission resource corresponds to the feedback information transmission time, and the terminal device may determine the time domain position of the feedback information transmission resource according to the transmission time information of feedback information. Thus, in this embodiment and related embodiments described below, feedback information transmission resources may be determined by describing a process of determining the feedback information transmission time by a terminal device. The terminal device may determine the position of the feedback information transmission resource according to the transmission time information of feedback information.

In the embodiments of the present disclosure, the feedback information transmission time may be embodied as the time interval between the time slot where the feedback information is and the time slot where the end time of the transmission channel is. The time interval may be one or more time slots. In FIG. 11, time intervals corresponding to the first carrier and the second carrier are denoted as the first time interval and the second time interval respectively.

The two time domain resource ranges may be the same or different. In FIG. 11, the end time of the first transmission channel is the same as the end time of the second transmission channel. The first time interval obtained according to the first information is different from the second time interval obtained according to the second information. Then it can be derived that the feedback information transmission time of the first transmission channel and the feedback information transmission time of the second transmission channel are different. Referring to FIG. 11, "feedback information 1" and "feedback information 2" correspond to different time points.

Figure 12:
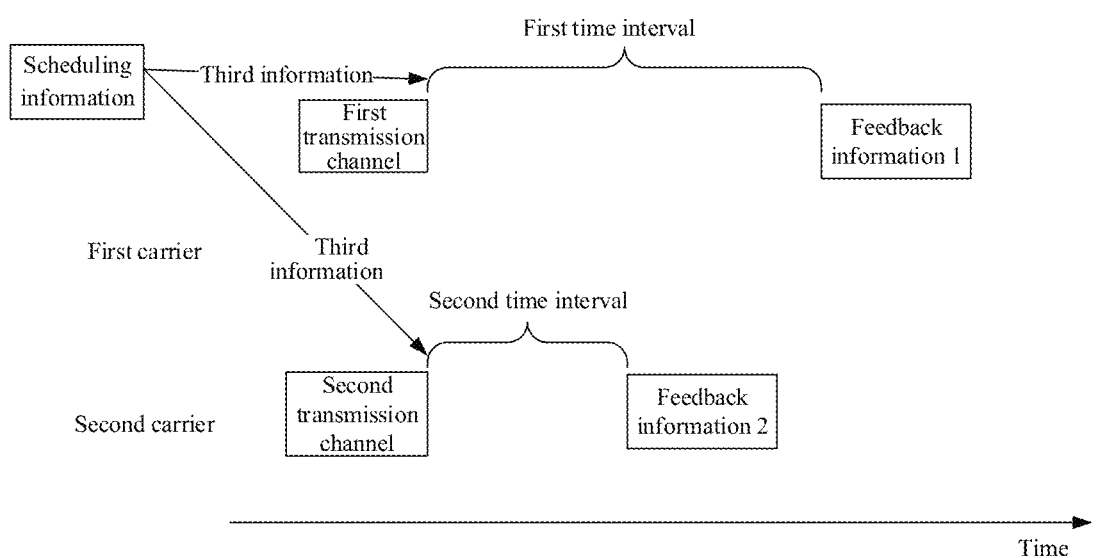
FIG. 12-FIG. 14 are effect schematic diagrams of indicating the transmission times of two pieces of feedback information by the third information according to embodiments of the present disclosure.
Figure 13:
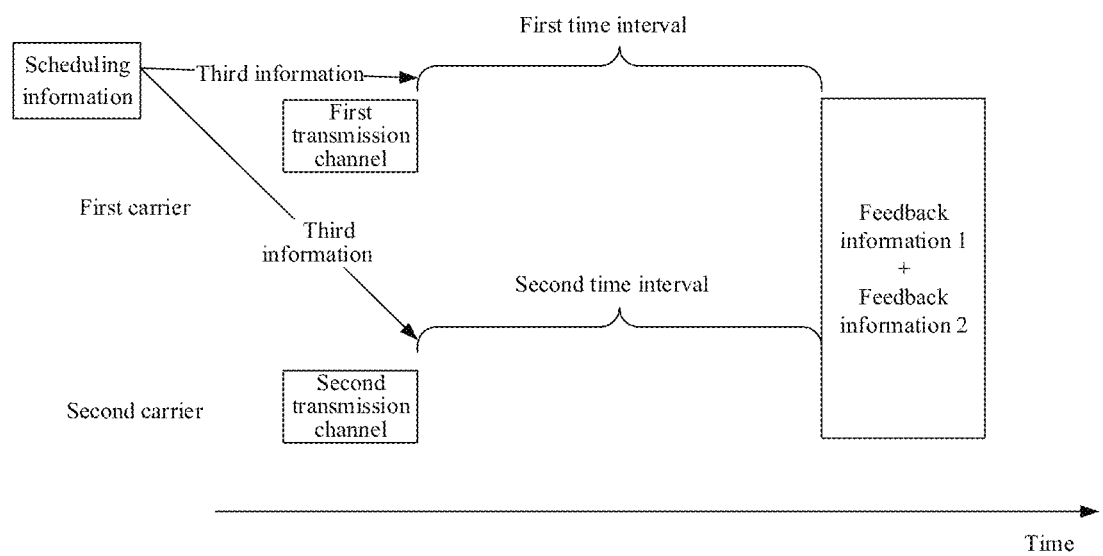
Figure 14:
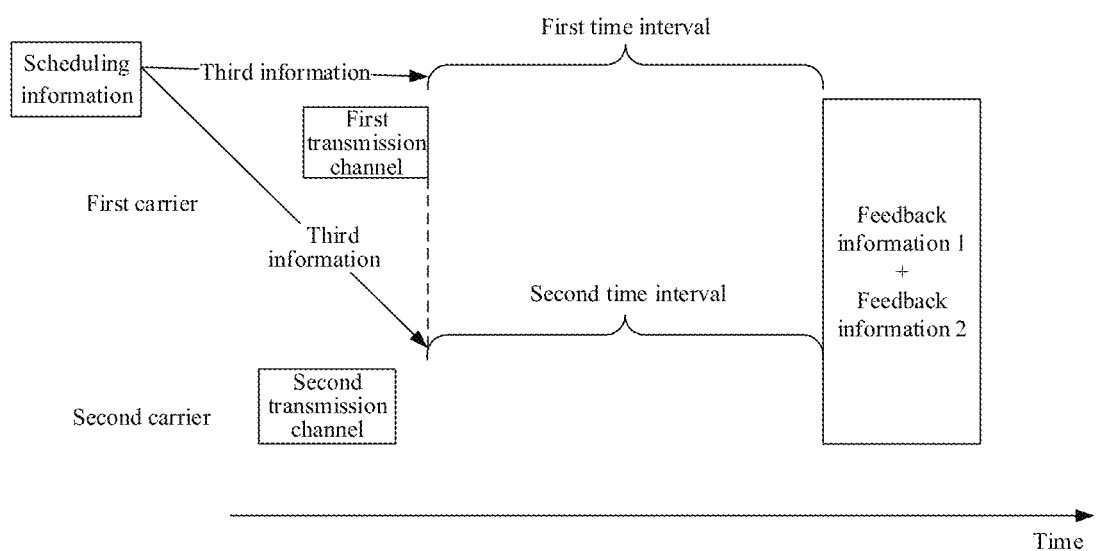

Embodiment 6: The Third Information Indicates Two Feedback Information Transmission Times In this embodiment, two feedback information transmission times are determined by using the third information, which may be implemented in various implementation manners. FIG. 12, FIG. 13 and FIG. 14 respectively show three different situations, which will be described separately below.

Referring to the embodiment of FIG. 12, the third information indicates two different feedback information transmission times.

Specifically, in FIG. 12, the sub-carrier spacing of the first carrier on which the first transmission channel is located is different from the sub-carrier spacing of the second carrier on which the second transmission channel is located. According to the third information, it can be derived that the feedback information transmission times respectively corresponding to the first transmission channel and the second transmission channel are different. Referring to FIG. 12, "feedback information 1" and "feedback information 2" correspond to different time points.

Referring to the embodiment of FIG. 13 the third information indicates two same feedback information transmission times.

Specifically, in FIG. 13, the sub-carrier spacing of the first carrier on which the first transmission channel is located is different from the sub-carrier spacing of the second carrier on which the second transmission channel is located. Here, for example, a sub-carrier spacing corresponding to a first carrier may be used as a reference sub-carrier spacing in accordance with protocol conventions (e.g. the manners of protocol conventions, high layer signaling configuration, etc.), or for example, the subcarrier spacing corresponding to the first carrier is used as the reference subcarrier spacing according to the fourth information, so that the feedback information transmission time of the first transmission channel and the feedback information transmission time of the second transmission channel are the same. Referring to FIG. 13, "feedback information 1" and "feedback information 2" correspond to the same time point.

Referring to the embodiment of FIG. 14, the third information indicates two same feedback information transmission times.

Specifically, in FIG. 14, the time intervals of the first transmission channel and the second transmission channel obtained according to the third information are the same (in FIG. 14, the first time interval is the same as the second time interval). However, the end time of the first transmission channel and the end time of the second transmission channel are different (in FIG. 14, the end time of the first transmission channel is later than the end time of the second transmission channel). At this time, in order to simplify the transmission process of feedback information, it is desirable that the feedback information transmission time of the first transmission channel and the feedback information transmission time of the second transmission channel are the same. Thus, a later end time may be used as the starting time of the second time interval. For example, the starting time of the second time interval corresponding to the second transmission channel may be delayed. Referring to the dotted line in FIG. 14, the starting time of the first time interval and the starting time of the second time interval are the same, then it may be finally obtained that the feedback information transmission time of the first transmission channel and the feedback information transmission time of the second transmission channel are the same. For example, in FIG. 14, "feedback information 1" and "feedback information 2" correspond to the same time point.

Figure 15:
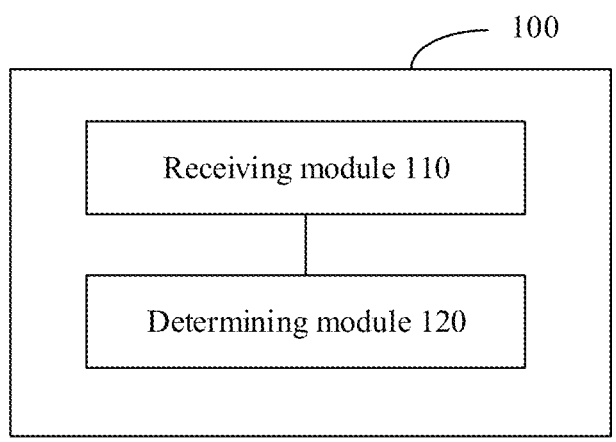
FIG. 15 is a schematic structural block diagram of a terminal device according to embodiments of the present disclosure.

The specific arrangement and implementation of the embodiments of the present disclosure have been described above from different angles through a plurality of embodiments. Corresponding to the processing method of at least one embodiment described above, the embodiments of the present disclosure further provide a terminal device 100. Referring to FIG. 15, the terminal device includes a receiving module 110 and a determining module 120.

The receiving module 110 is configured to receive first scheduling information. The first scheduling information is used for scheduling at least two physical channels.

The determining module 120 is configured to determine transmission resources of the at least two physical channels according to the first scheduling information.

Figure 16:
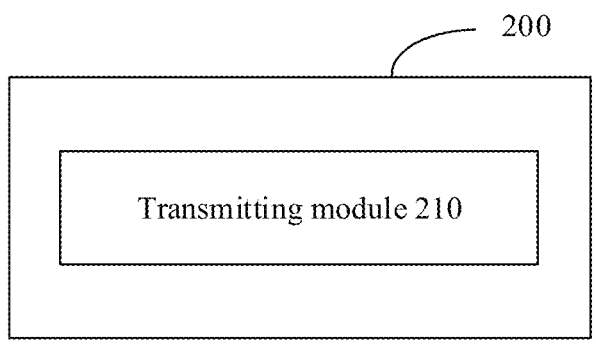
FIG. 16 is a schematic structural block diagram of a network device according to embodiments of the present disclosure.

Corresponding to the processing method of at least one embodiment described above, the embodiments of the present disclosure further provide a network device 200. Referring to FIG. 16, the network device includes a transmitting module 210.

The transmitting module 210 is configured to transmit first scheduling information to a terminal device. The first scheduling information is used for scheduling at least two physical channels. The first scheduling information is used for the terminal device to determine transmission resources of the at least two physical channels.

The terminal device 100 and the network device 200 of the embodiments of the present disclosure can implement the corresponding functions of the terminal device and the network device in the above method embodiments. The flows, functions, implementation manners and beneficial effects corresponding to various modules (sub-modules, units or components, etc.) in the terminal device 100 and the network device 200 can be referred to the corresponding description in the above method embodiments. Elaborations are omitted herein.

It should be noted that the functions of the various modules (sub-modules, units or components, etc.) in the terminal device 100 and the network device 200 of the embodiments of the present disclosure can be implemented by different modules (sub-modules, units or components, etc.) or by the same module (sub-module, unit or component, etc.). For example, the first transmission module and the second transmission module may be different modules or the same module, and the corresponding functions of the terminal device of the embodiments of the present disclosure can be implemented in both situations.

Figure 17:
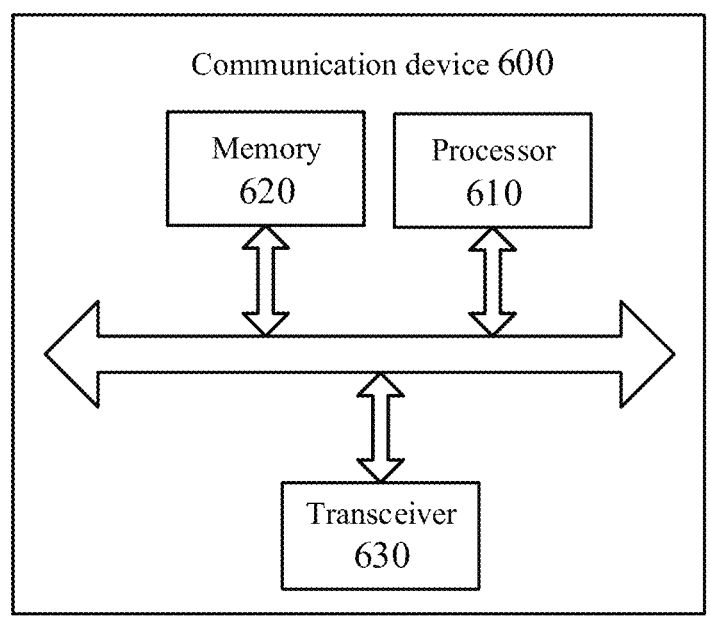
FIG. 17 is a schematic block diagram of a communication device according to embodiments of the present disclosure.

FIG. 17 is a schematic structural diagram of a communication device 600 according to the embodiments of the present disclosure. The communication device 600 includes a processor 610. The processor 610 invokes and runs a computer program from memory to implement the method in the embodiments of the present disclosure.

Alternatively, the communication device 600 may also include a memory 620. The processor 610 may invoke and run a computer program from memory 620 to implement the method in embodiments of the present disclosure.

The memory 620 may be a separate device independent of the processor 610 or may be integrated in the processor 610.

Alternatively, the communication device 600 may also include a transceiver 630. The processor 610 may control the transceiver 630 to communicate with other devices. Specifically, the transceiver 630 may transmit information or data to other devices or receive information or data transmitted by other devices.

The transceiver 630 may include a transmitter and a receiver. The transceiver 630 may further include antennas, and the number of antennas may be one or more.

Alternatively, the communication device 600 may be the network device of embodiments of the present disclosure, and the communication device 600 may implement corresponding processes implemented by the network device in the various methods of the embodiments of the present disclosure. For the sake of brevity, elaborations are omitted herein.

Alternatively, the communication device 600 may be the terminal device of embodiments of the present disclosure, and the communication device 600 may implement corresponding processes implemented by the terminal device in the various methods of the embodiments of the present disclosure. For the sake of brevity, elaborations are omitted herein.

Figure 18:
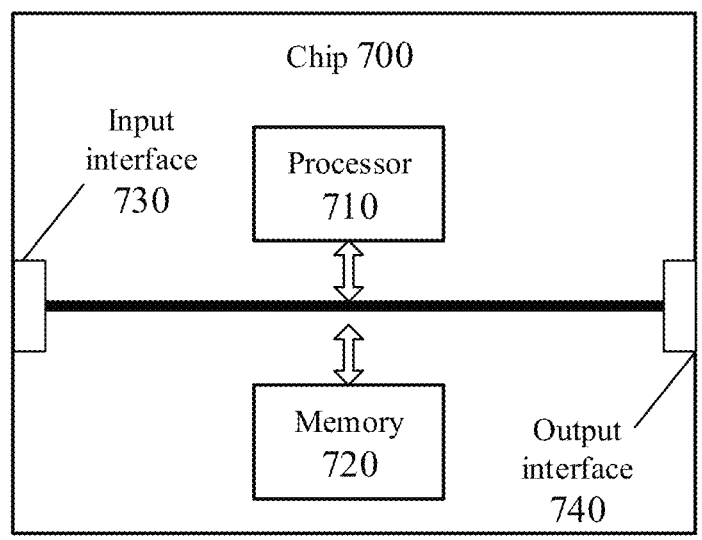
FIG. 18 is a schematic block diagram of a chip according to embodiments of the present disclosure.

FIG. 18 is a schematic structural diagram of a chip 700 according to the embodiments of the present disclosure. The chip 700 includes a processor 710. The processor 710 can invoke and run a computer program from memory to implement the method in the embodiments of the present disclosure.

Alternatively, the chip 700 may also include a memory 720. The processor 710 may invoke and run a computer program from the memory 720 to implement the method in embodiments of the present disclosure.

The memory 720 may be a separate device independent of the processor 710 or may be integrated in the processor 710.

Alternatively, the chip 700 may also include an input interface 730. The processor 710 may control the input interface 730 to communicate with other devices or chips. Specifically, the input interface 730 may obtain information or data transmitted by other devices or chips.

Alternatively, the chip 700 may also include an output interface 740. The processor 710 may control the output interface 740 to communicate with other devices or chips. Specifically, the output interface 740 may output information or data to other devices or chips.

Alternatively, the chip may be applied to the network device in the embodiments of the present disclosure, and the chip can implement the corresponding flows realized by the network device in various methods of the embodiments of the present disclosure. For the sake of brevity, elaborations are omitted herein.

Alternatively, the chip may be applied to the terminal device in the embodiments in FIG. 15 of the present disclosure, and the chip can implement corresponding processes implemented by the terminal device in the various methods of the embodiments of the present disclosure. For the sake of brevity, elaborations are omitted herein.

It should be understood that the chips referred to in embodiments of the present disclosure may also be referred to as system level chip, system chip, chip system, system-on-chip or the like.

The processor mentioned above may be a general purpose processor, a digital signal processor (DSP), a field programmable gate array (FPGA), an application specific integrated circuit (ASIC), or other programmable logic devices, transistor logic devices, discrete hardware components, and the like. The general purpose processor mentioned above may be a microprocessor or any conventional processor or the like.

The memory mentioned above may be a volatile memory or a non-volatile memory or may include both a volatile memory and a non-volatile memory. The non-volatile memory may be read-only memory (ROM), programmable ROM (PROM), erasable PROM (EPROM), electrically EPROM (EEPROM) or flash memory. The volatile memory may be a random access memory (RAM).

It should be understood that the memory described above is exemplary but not limiting. For example, the memory in embodiments of the present disclosure may also be static RAM (SRAM), dynamic RAM (DRAM), synchronous DRAM (SDRAM), double data rate SDRAM (DDR SDRAM), enhanced SDRAM (ESDRAM), synch link DRAM (SLDRAM), Direct Rambus RAM (DR RAM), etc. That is, the memory in embodiments of the present disclosure is intended to include but not limited to these and any other suitable types of memory.

Figure 19:
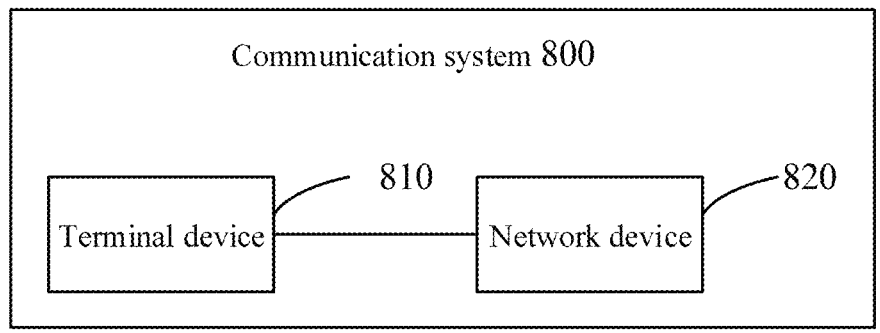
FIG. 19 is a schematic block diagram of a communication system according to embodiments of the present disclosure.

FIG. 19 is a schematic block diagram of a communication system 800 including a terminal device 810 and a network device 820 according to the embodiments of the present disclosure.

The terminal device 810 may be used to implement corresponding functions implemented by the terminal device in the methods of various embodiments of the present disclosure, and the network device 820 may be used to implement corresponding functions implemented by the network device in the methods of various embodiments of the present disclosure. For the sake of brevity, elaborations are omitted herein.

The above-described embodiments may be implemented in whole or in part by software, hardware, firmware or any combination thereof. When implemented in software, they may be implemented in whole or in part in the form of a computer program product. The computer program product includes one or more computer instructions. When the computer program instructions are loaded and executed on a computer, the flow or function described in accordance with embodiments of the present disclosure is generated in whole or in part. The computer may be a general purpose computer, a special purpose computer, a computer network, or other programmable device. The computer instructions may be stored in a computer-readable storage medium, or transmitted from one computer-readable storage medium to another. For example, the computer instructions may be transmitted from one Web site, computer, server, or data center to another Web site, computer, server, or data center via wired (e.g. coaxial cable, optical fiber, Digital Subscriber Line (DSL)) or wireless (e.g. infrared, wireless, microwave, etc.). The computer-readable storage medium may be any usable medium accessible to a computer or a data storage device such as a server, data center, etc. containing one or more usable media integration. The usable media may be magnetic media (e.g. floppy disk, hard disk, magnetic tape), optical media (e.g. DVD), or semiconductor media (e.g. Solid State Disk (SSD)), etc.

It should be understood that in various embodiments of the present disclosure, the size of the sequence number of the above-mentioned processes does not mean the order of execution, and the execution order of various processes should be determined by its function and inherent logic, and should not be limited in any way to the implementation process of the embodiments of the present disclosure.

Those skilled in the art will clearly appreciate that, for convenience and conciseness of description, the specific operating processes of the above-described systems, devices and units may refer to the corresponding processes in the aforementioned method embodiments. Elaborations are omitted herein.

The above description is only the specific embodiments of the present disclosure, but the scope of protection of the present disclosure is not limited thereto. Any person skilled in the art who is familiar with the technical filed can easily think of changes or substitutions, which should cover within the scope of protection of the present disclosure. Therefore, the protection scope of the present disclosure should be subject to the protection scope of the claims.

The invention claimed is:

1. A method for scheduling resource, applicable for a terminal device, comprising:
   receiving, by the terminal device, first scheduling information, wherein the first scheduling information is used for scheduling at least two physical channels; and
   determining, by the terminal device, transmission resources of the at least two physical channels according to the first scheduling information, wherein,
   the at least two physical channels comprise a first physical channel and a second physical channel,
   the first scheduling information comprises third information, and
   the third information is used for determining a transmission resource of the first physical channel and a transmission resource of the second physical channel,
   wherein determining, by the terminal device, the transmission resources of the at least two physical channels according to the first scheduling information comprises:
   determining, by the terminal device, time domain resource ranges of the first physical channel and the second physical channel according to the third information; and determining, by the terminal device, feedback information transmission resources of the first physical channel and the second physical channel according to the third information.

2. The method of claim 1, wherein,
the transmission resources comprise at least one of the following: time domain resources, frequency domain resources and feedback information transmission resources.

3. The method of claim 1, wherein,
the first physical channel corresponds to a first sub-carrier spacing,
the second physical channel corresponds to a second sub-carrier spacing,
determining, by the terminal device, the feedback information transmission resources of the first physical channel and the second physical channel according to the third information comprises:
when the first sub-carrier spacing is different from the second sub-carrier spacing, determining, by the terminal device, the feedback information transmission resources of the first physical channel and the second physical channel according to the third information and a reference sub-carrier spacing; or
when the first sub-carrier spacing is different from the second sub-carrier spacing, determining, by the terminal device, a feedback information transmission resource of the first physical channel according to the third information and the first sub-carrier spacing, and determining, by the terminal device, a feedback information transmission resource of the second physical channel according to the third information and the second sub-carrier spacing; or
when the first sub-carrier spacing is the same as the second sub-carrier spacing, determining, by the terminal device, the feedback information transmission resources of the first physical channel and the second physical channel according to the third information and the reference sub-carrier spacing; or
when the first sub-carrier spacing is the same as the second sub-carrier spacing, determining, by the terminal device, the feedback information transmission resources of the first physical channel and the second physical channel according to the third information and a fourth sub-carrier spacing, wherein the fourth sub-carrier spacing is equal to the first sub-carrier spacing or the second sub-carrier spacing; or
when the first sub-carrier spacing is the same as the second sub-carrier spacing and an end time of the first physical channel is different from an end time of the second physical channel, determining, by the terminal device, the feedback information transmission resources of the first physical channel and the second physical channel based on a later end time.

4. The method of claim 3, wherein a time domain position of the feedback information transmission resource of the first physical channel determined according to the third information is the same as a time domain position of the feedback information transmission resource of the second physical channel.

5. The method of claim 3, wherein,
the reference sub-carrier spacing is a smaller one of the first sub-carrier spacing and the second sub-carrier spacing; or,
the reference sub-carrier spacing is a greater one of the first sub-carrier spacing and the second sub-carrier spacing; or, the reference sub-carrier spacing is predetermined by a protocol; or,
the reference subcarrier spacing is configured by a high layer; or,
the reference subcarrier spacing is determined based on a fourth information in the first scheduling information.

6. The method of claim 1, wherein,
the third information comprises a first part of information and a second part of information,
the first part of information is used for indicating at least one of the following of the first physical channel: a time domain resource range, a frequency domain resource range, a feedback information transmission resource, and
the second part of information is used for indicating at least one of the following of the second physical channel: a time domain resource range, a frequency domain resource range, a feedback information transmission resource.

7. The method of claim 1, wherein the first scheduling information comprises downlink control information (DCI).

8. A terminal device comprising a processor and a memory, wherein the memory is configured to store a computer program, the processor is configured to invoke and run the computer program stored in the memory to perform:
receiving first scheduling information, wherein the first scheduling information is used for scheduling at least two physical channels;
determining transmission resources of the at least two physical channels according to the first scheduling information, wherein,
the at least two physical channels comprise a first physical channel and a second physical channel,
the first scheduling information comprises third information, and
the third information is used for determining a transmission resource of the first physical channel and a transmission resource of the second physical channel,
wherein determining the transmission resources of the at least two physical channels according to the first scheduling information comprises:
determining time domain resource ranges of the first physical channel and the second physical channel according to the third information; and
determining feedback information transmission resources of the first physical channel and the second physical channel according to the third information.

9. The terminal device of claim 8, wherein,
the first physical channel corresponds to a first sub-carrier spacing,
the second physical channel corresponds to a second sub-carrier spacing,
determining the feedback information transmission resources of the first physical channel and the second physical channel according to the third information comprises:
when the first sub-carrier spacing is different from the second sub-carrier spacing, determining the feedback information transmission resources of the first physical channel and the second physical channel according to the third information and a reference sub-carrier spacing; or
when the first sub-carrier spacing is different from the second sub-carrier spacing, determining a feedback information transmission resource of the first physical channel according to the third information and the first sub-carrier spacing, and determining a feedback information transmission resource of the second physical channel according to the third information and the second sub-carrier spacing; or when the first sub-carrier spacing is the same as the second sub-carrier spacing, determining the feedback information transmission resources of the first physical channel and the second physical channel according to the third information and the reference sub-carrier spacing; or when the first sub-carrier spacing is the same as the second sub-carrier spacing, determining the feedback information transmission resources of the first physical channel and the second physical channel according to the third information and a fourth sub-carrier spacing, wherein the fourth sub-carrier spacing is equal to the first sub-carrier spacing or the second sub-carrier spacing; or when the first sub-carrier spacing is the same as the second sub-carrier spacing and an end time of the first physical channel is different from an end time of the second physical channel, determining the feedback information transmission resources of the first physical channel and the second physical channel based on a later end time.

10. The terminal device of claim 9, wherein,
the reference sub-carrier spacing is a smaller one of the first sub-carrier spacing and the second sub-carrier spacing; or,
the reference sub-carrier spacing is a greater one of the first sub-carrier spacing and the second sub-carrier spacing; or,
the reference sub-carrier spacing is predetermined by a protocol; or,
the reference subcarrier spacing is configured by a high layer, or,
the reference subcarrier spacing is determined based on a fourth information in the first scheduling information.

11. The terminal device of claim 8, wherein a time domain position of the feedback information transmission resource of the first physical channel determined according to the third information is the same as a time domain position of the feedback information transmission resource of the second physical channel.

12. The terminal device of claim 8, wherein,
the third information comprises a first part of information and a second part of information,
the first part of information is used for indicating at least one of the following of the first physical channel: a time domain resource range, a frequency domain resource range, a feedback information transmission resource, and
the second part of information is used for indicating at least one of the following of the second physical channel: a time domain resource range, a frequency domain resource range, a feedback information transmission resource.

13. The terminal device of claim 8, wherein the first scheduling information comprises downlink control information (DCI).

14. A network device comprising a processor and a memory, wherein the memory is configured to store a computer program, the processor is configured to invoke and run the computer program stored in the memory to perform:
transmitting first scheduling information to a terminal device, wherein the first scheduling information is used for scheduling at least two physical channels,
wherein the first scheduling information is used for the terminal device to determine transmission resources of the at least two physical channels, wherein,
the at least two physical channels comprise a first physical channel and a second physical channel,
the first scheduling information comprise third information, and
the third information is used for the terminal device to determine a transmission resource of the first physical channel and a transmission resource of the second physical channel,
wherein the third information is used for the terminal device to determine time domain resource ranges of the first physical channel and the second physical channel, and is used for the terminal device to determine feedback information transmission resources of the first physical channel and the second physical channel.

15. The network device of claim 14, wherein,
the transmission resources comprise at least one of the following: time domain resources, frequency domain resources and feedback information transmission resources.

16. The network device of claim 14, wherein,
the first physical channel corresponds to a first sub-carrier spacing,
the second physical channel corresponds to a second sub-carrier spacing,
when the first sub-carrier spacing is different from the second sub-carrier spacing, the feedback information transmission resources of the first physical channel and the second physical channel are determined by the terminal device according to the third information and a reference sub-carrier spacing; or
when the first sub-carrier spacing is different from the second sub-carrier spacing, a feedback information transmission resource of the first physical channel is determined by the terminal device according to the third information and the first sub-carrier spacing, and a feedback information transmission resource of the second physical channel is determined by the terminal device according to the third information and the second sub-carrier spacing; or
when the first sub-carrier spacing is the same as the second sub-carrier spacing, the feedback information transmission resources of the first physical channel and the second physical channel are determined by the terminal device according to the third information and the reference sub-carrier spacing; or
when the first sub-carrier spacing is the same as the second sub-carrier spacing, the feedback information transmission resources of the first physical channel and the second physical channel are determined by the terminal device according to the third information and a fourth sub-carrier spacing, wherein the fourth sub-carrier spacing is equal to the first sub-carrier spacing or the second sub-carrier spacing; or
when the first sub-carrier spacing is the same as the second sub-carrier spacing and an end time of the first physical channel is different from an end time of the second physical channel, the feedback information transmission resources of the first physical channel and the second physical channel are determined by the terminal device based on a later end time.

17. The method of claim 16, wherein,
the reference sub-carrier spacing is a smaller one of the first sub-carrier spacing and the second sub-carrier spacing; or, the reference sub-carrier spacing is a greater one of the first sub-carrier spacing and the second sub-carrier spacing; or, the reference sub-carrier spacing is predetermined by a protocol; or, the reference subcarrier spacing is configured by a high layer; or, the reference subcarrier spacing is determined based on a fourth information in the first scheduling information.

18. The network device of claim 14, wherein a time domain position of the feedback information transmission resource of the first physical channel determined according to the third information is the same as a time domain position of the feedback information transmission resource of the second physical channel.

19. The network device of claim 14, wherein, the third information comprises a first part of information and a second part of information, the first part of information is used for indicating at least one of the following of the first physical channel: a time domain resource range, a frequency domain resource range, a feedback information transmission resource, and the second part of information is used for indicating at least one of the following of the second physical channel: a time domain resource range, a frequency domain resource range, a feedback information transmission resource.

20. The method of claim 14, wherein the first scheduling information comprises downlink control information (DCI).

* * * * *